United States Patent
Miwa

(10) Patent No.: US 10,281,971 B2
(45) Date of Patent: May 7, 2019

(54) INFORMATION PROCESSING DEVICE, AND METHOD OF ANALYZING POWER CONSUMPTION OF PROCESSOR

(71) Applicant: FUJITSU LIMITED, Kawasaki-shi, Kanagawa (JP)

(72) Inventor: Masahiro Miwa, Kawaguchi (JP)

(73) Assignee: FUJITSU LIMITED, Kawasaki (JP)

(*) Notice: Subject to any disclaimer, the term of this patent is extended or adjusted under 35 U.S.C. 154(b) by 106 days.

(21) Appl. No.: 15/484,373

(22) Filed: Apr. 11, 2017

(65) Prior Publication Data

US 2017/0300102 A1    Oct. 19, 2017

(30) Foreign Application Priority Data

Apr. 13, 2016   (JP) .................................. 2016-080400

(51) Int. Cl.
*G06F 1/32*    (2019.01)
*G06F 1/324*   (2019.01)
(Continued)

(52) U.S. Cl.
CPC .............. *G06F 1/324* (2013.01); *G06F 1/329* (2013.01); *G06F 1/3243* (2013.01);
(Continued)

(58) Field of Classification Search
CPC ...... G06F 1/324; G06F 1/3243; G06F 1/3275; G06F 1/329; G06F 9/5094
(Continued)

(56) References Cited

U.S. PATENT DOCUMENTS 6,052,792 A * 4/2000 Mensch, Jr. .............. G06F 1/08
                                                   713/322
6,205,555 B1 * 3/2001 Kageshima ............... G06F 1/26
                                                   713/300

(Continued)

FOREIGN PATENT DOCUMENTS

JP    2013-218721    10/2013
JP    2014-506354     3/2014

OTHER PUBLICATIONS

Miyuki Ono et al., "Method of Analyzing Power Consumed for Executing Software", A research report by Information Processing Society of Japan, SIG Technical Report, vol. 2015-HPC-150, No. 29, pp. 1-6, Power Profiling Feature, Aug. 5, 2015 (with partial English translation), (7 pages).
(Continued)

*Primary Examiner* — Volvick Derose
(74) *Attorney, Agent, or Firm* — Fujitsu Patent Center

(57) ABSTRACT

An information processing device includes: a memory; and a processor coupled to the memory. The processor is configured to: set a first limit value of power consumption that the processor is permitted to consume during execution of a program to be analyzed, control execution of the program, control the processor to enable a generation of at least one interrupt during the execution of the program, acquire executed function information indicating a currently executed function included in the program and a first operational frequency of the processor during the execution of the function included in the program, and output the executed function information and limit information indicating whether the first operational frequency of the processor was limited by the first limit value to the memory.

12 Claims, 22 Drawing Sheets

(51) Int. Cl.
  *G06F 1/3234* (2019.01)
  *G06F 1/329* (2019.01)
  *G06F 9/50* (2006.01)
  *G06F 1/3203* (2019.01)

(52) U.S. Cl.
  CPC .......... *G06F 1/3275* (2013.01); *G06F 9/5094* (2013.01); *G06F 1/3203* (2013.01); *Y02D 10/126* (2018.01); *Y02D 10/152* (2018.01); *Y02D 10/24* (2018.01)

(58) Field of Classification Search
  USPC ......................................................... 713/322
  See application file for complete search history.

(56) References Cited

U.S. PATENT DOCUMENTS

| | | | | |
|---|---|---|---|---|
| 2003/0191976 A1* | 10/2003 | Cyran | G06F 11/3017 | 713/340 |
| 2004/0268159 A1* | 12/2004 | Aasheim | G06F 1/3203 | 713/300 |
| 2005/0055590 A1* | 3/2005 | Farkas | G06F 1/206 | 713/320 |
| 2006/0095807 A1* | 5/2006 | Grochowski | G06F 1/206 | 713/324 |
| 2007/0162780 A1* | 7/2007 | Wang | G06F 1/3203 | 713/600 |
| 2007/0186024 A1* | 8/2007 | Aberg | G06F 9/4812 | 710/269 |
| 2007/0206018 A1* | 9/2007 | Bajic | G06F 1/3225 | 345/501 |
| 2007/0220293 A1* | 9/2007 | Takase | G06F 1/3203 | 713/320 |
| 2008/0059814 A1* | 3/2008 | Esliger | G06F 1/3203 | 713/300 |
| 2008/0201590 A1* | 8/2008 | Rizzo | G06F 1/08 | 713/322 |
| 2009/0031155 A1* | 1/2009 | Hofmann | G06F 1/3203 | 713/321 |
| 2010/0149199 A1* | 6/2010 | Jacoby | G06F 9/5016 | 345/541 |
| 2010/0322318 A1* | 12/2010 | Sadowski | H04N 19/176 | 375/240.25 |
| 2011/0008012 A1* | 1/2011 | Kulkarni | G06F 1/3203 | 386/240 |
| 2011/0055831 A1* | 3/2011 | Heller, Jr. | G06F 9/5094 | 718/100 |
| 2011/0289329 A1* | 11/2011 | Bose | G06F 1/329 | 713/320 |
| 2013/0024707 A1* | 1/2013 | Miwa | G06F 1/3225 | 713/322 |
| 2013/0132048 A1* | 5/2013 | Yamamoto | G06F 11/302 | 703/2 |
| 2013/0205126 A1* | 8/2013 | Kruglick | G06F 1/3296 | 713/1 |
| 2013/0268742 A1* | 10/2013 | Yamada | G06F 9/5044 | 712/226 |
| 2013/0318375 A1* | 11/2013 | Kurihara | G06F 1/3203 | 713/320 |
| 2014/0095906 A1* | 4/2014 | Hurd | G06F 1/3293 | 713/320 |
| 2014/0357224 A1* | 12/2014 | Walley | H04M 15/8038 | 455/407 |
| 2014/0376618 A1* | 12/2014 | Ma | H04N 19/127 | 375/240.03 |
| 2015/0185795 A1 | 7/2015 | Distefano et al. | | |
| 2016/0062445 A1* | 3/2016 | Choi | G06F 1/325 | 713/320 |
| 2016/0179164 A1* | 6/2016 | Park | G06F 1/324 | 713/322 |
| 2017/0108908 A1* | 4/2017 | Kruglick | G06F 1/3203 | |

OTHER PUBLICATIONS

Kashif Nizam Khan et al., "Energy Profiling using IgProf", 2015 15th IEEE/ACM International Symposium on Cluster, Cloud and Grid Computing, pp. 1115-1118 (4 pages).

* cited by examiner

FIG. 14

| INFORMATION ID | PROCESS ID | INSTRUCTION ADDRESS | OPERATIONAL LEVEL | TIME |
|---|---|---|---|---|
| 1 | A | 0x00003121 | 0x1400 | 10:10:00.0000 |
| 2 | A | 0x00006b33 | 0x1200 | 10:10:00.0001 |
| 3 | A | 0x00003831 | 0x1400 | 10:10:00.0002 |
| 4 | A | 0x00009002 | 0x1100 | 10:10:00.0003 |
| 5 | A | 0x000450ab | 0x1400 | 10:10:00.0004 |

FIG. 15

| INFORMATION ID | OPERATIONAL LEVEL | OPERATIONAL FREQUENCY (GHz) |
|---|---|---|
| 1 | 0x1400 | 2.0 |
| 2 | 0x1200 | 1.9 |
| 3 | 0x1400 | 1.8 |
| 4 | 0x1100 | 1.7 |
| 5 | 0x1400 | 1.6 |

FIG. 16

| INFORMATION ID | INSTRUCTION ADDRESSES | FUNCTION NAME |
|---|---|---|
| 1 | 0x00003000-0x00004fff | FUNCTION A |
| 2 | 0x00005000-0x00007fff | FUNCTION B |
| 3 | 0x00008000-0x0000afff | FUNCTION C |
| 4 | 0x00034000-0x0004ffff | FUNCTION D |

FIG. 17

| INFORMATION ID | FUNCTION NAME |
|---|---|
| 1 | FUNCTION B |
| 2 | FUNCTION C |

FIG. 20

| INFORMATION ID | PROCESS ID | INSTRUCTION ADDRESS | OPERATIONAL LEVEL | TIME |
|---|---|---|---|---|
| 1 | A | 0x00003121 | 0x1400 | 10:13:00.0000 |
| 2 | A | 0x00006b33 | 0x1400 | 10:13:00.0001 |
| 3 | A | 0x00003831 | 0x1400 | 10:13:00.0002 |
| 4 | A | 0x00009002 | 0x1200 | 10:13:00.0003 |
| 5 | A | 0x000450ab | 0x1400 | 10:13:00.0004 |

FIG. 21

| INFORMATION ID | FUNCTION NAME |
|---|---|
| 1 | FUNCTION C |

FIG. 22

| INFORMATION ID | FUNCTION NAME |
|---|---|
| 1 | FUNCTION C |
| 2 | FUNCTION B |

INFORMATION PROCESSING DEVICE, AND METHOD OF ANALYZING POWER CONSUMPTION OF PROCESSOR

CROSS-REFERENCE TO RELATED APPLICATION

This application is based upon and claims the benefit of priority of the prior Japanese Patent Application No. 2016-080400, filed on Apr. 13, 2016, the entire contents of which are incorporated herein by reference.

FIELD

The embodiment discussed herein is related to an information processing device, a method of analyzing power consumption of a processor, and a computer-readable medium.

BACKGROUND

For example, an operator (hereinafter merely referred to as operator) that provides a service to users or the like performs power profiling on a program executed on a computer system or a program to be executed on the computer system.

The power profiling is to analyze characteristics of the amount of power consumed during the execution of the program, for example. By executing the power profiling, characteristics of the amount of power consumed for executing each of functions included in the program (hereinafter also referred to as program to be analyzed or verification program) may be acquired, for example. Thus, the operator may identify, as sections to be modified to improve performance, a function causing a large amount of power to be consumed and a function causing a large amount of power to be consumed per unit of time, from the functions included in the program to be analyzed. Hereinafter, power consumed per unit of time is also merely referred to as consumed power.

As examples of related art, the following techniques are known: Miyuki Ono et al., "Method of Analyzing Power Consumed for Executing Software", A research report by Information Processing Society of Japan Vol. 2015-HPC-150, No. 29, Aug. 5, 2015, p. 2, and Kashif Nizam Khan et al., "Energy Profiling using IgProf", 2015 15th IEEE/ACM International Symposium on Cluster, Cloud and Grid Computing, p. 1115-p. 1117.

SUMMARY

According to an aspect of the invention, an information processing device includes: a memory; and a processor coupled to the memory. The processor is configured to: set a first limit value of power consumption that the processor is permitted to consume during execution of a program to be analyzed, control execution of the program, control the processor to enable a generation of at least one interrupt during the execution of the program, acquire executed function information indicating a currently executed function included in the program and a first operational frequency of the processor during the execution of the function included in the program, and output the executed function information and limit information indicating whether the first operational frequency of the processor was limited by the first limit value to the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram describing an example of sampling information;

FIG. 15 is a diagram describing an example of association information;

FIG. 16 is a diagram describing an example of function information;

FIG. 17 is a diagram describing an example of limit information;

FIG. 20 is a diagram describing an example of other sampling information;

FIG. 21 is a diagram describing an example of other limit information; and

FIG. 22 is a diagram describing an example of the limit information.

DESCRIPTION OF EMBODIMENT

In the aforementioned power profiling, the operator performs sampling on a central processing unit (CPU) at predetermined time intervals for the execution of a program to be analyzed, for example. In this case, the CPU simultaneously assigns amounts of power to be consumed and measured by the CPU to executors and aggregates the assigned amounts, thereby achieving a power profile of the program. In this case, the operator performs the sampling at relatively short time intervals (hereinafter also merely referred to as sampling time intervals). This is due to the fact that if the sampling time intervals are long, various functions are executed after previous sampling and the amounts of power currently sampled and consumed by the program execution units may be inaccurate. In addition, if the sampling time intervals are long, it may be difficult to sample a function to be executed in a short time period, for example.

If the sampling time intervals are short, however, the frequency at which the CPU is interrupted is high. Thus, in this case, the performance of a computer system may be reduced due to the interrupt for the execution of the sampling, and a behavior that is different from that expected by the operator may occur.

In addition, if the sampling time intervals are short, the amount of information obtained by the sampling becomes large. Thus, in this case, if a size of storing the obtained information is large or a time period for executing the program to be analyzed is long, it may be difficult to acquire the power profile of the overall program.

According to an aspect of an embodiment, a function that causes power consumed for executing the function to exceed a threshold is identified without a reduction in sampling time intervals.

Configuration of Information Processing Device

Figure 1:
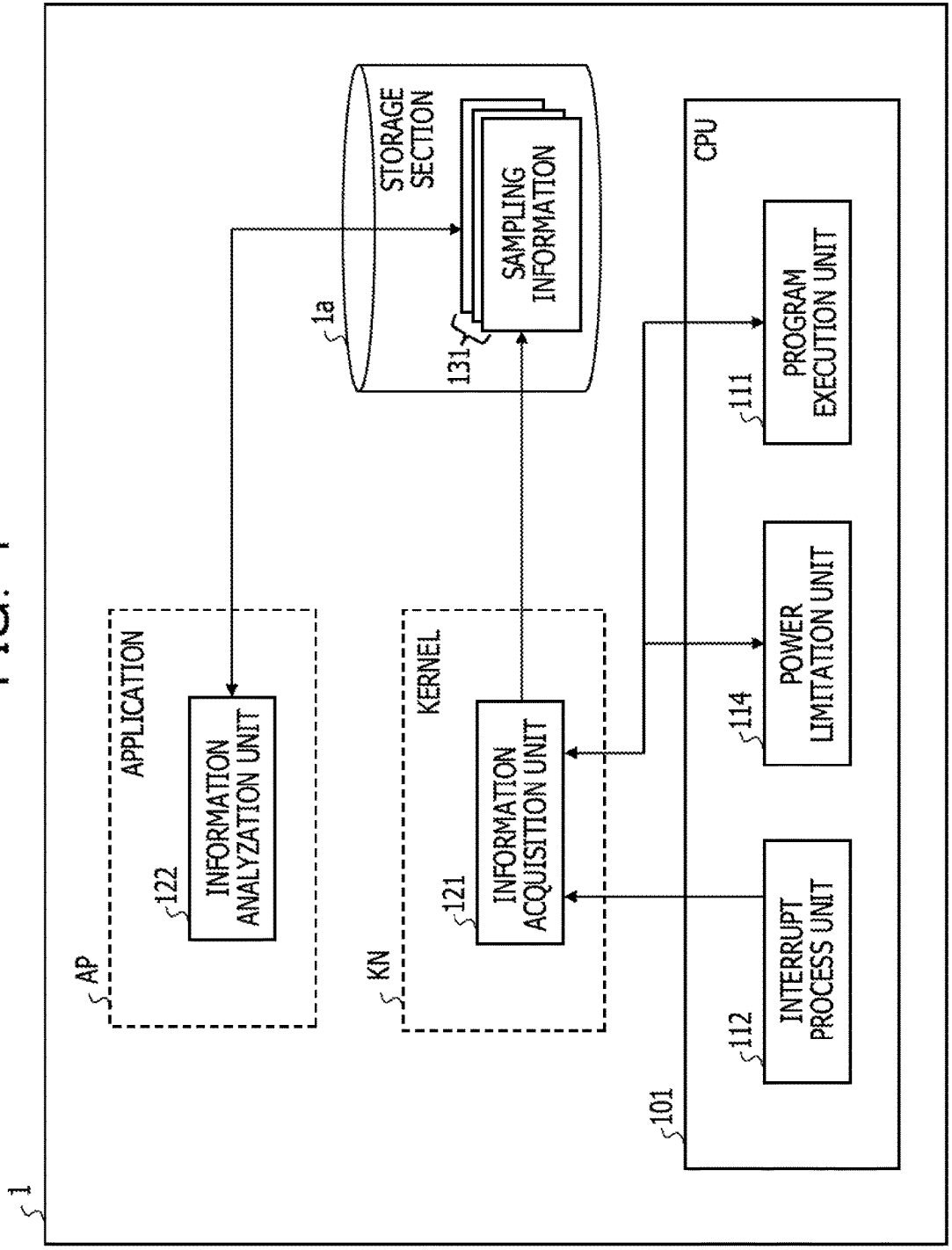
FIGS. 1, 2, and 3 illustrate an overall configuration of an information processing device.
Figure 2:
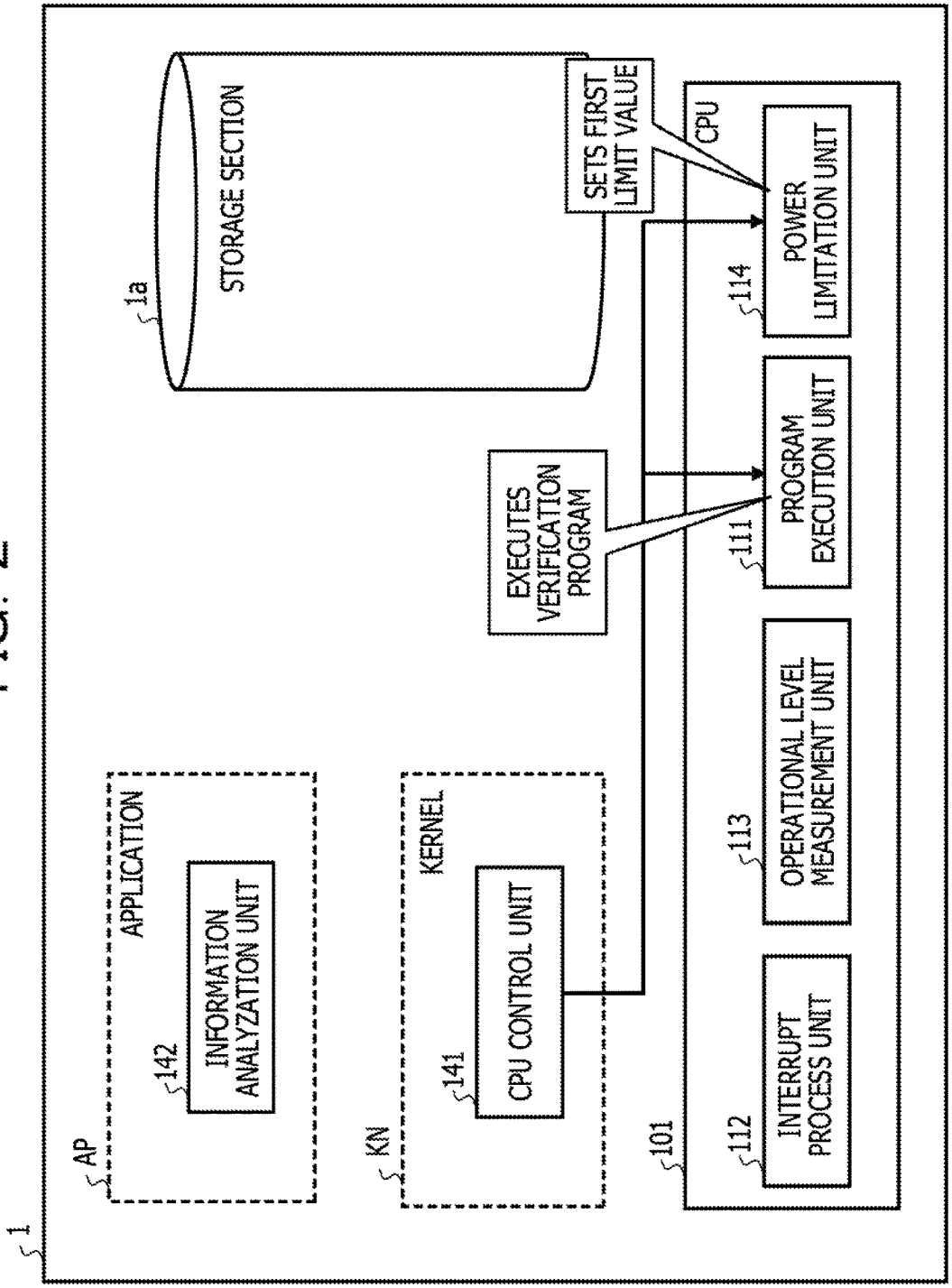
Figure 3:
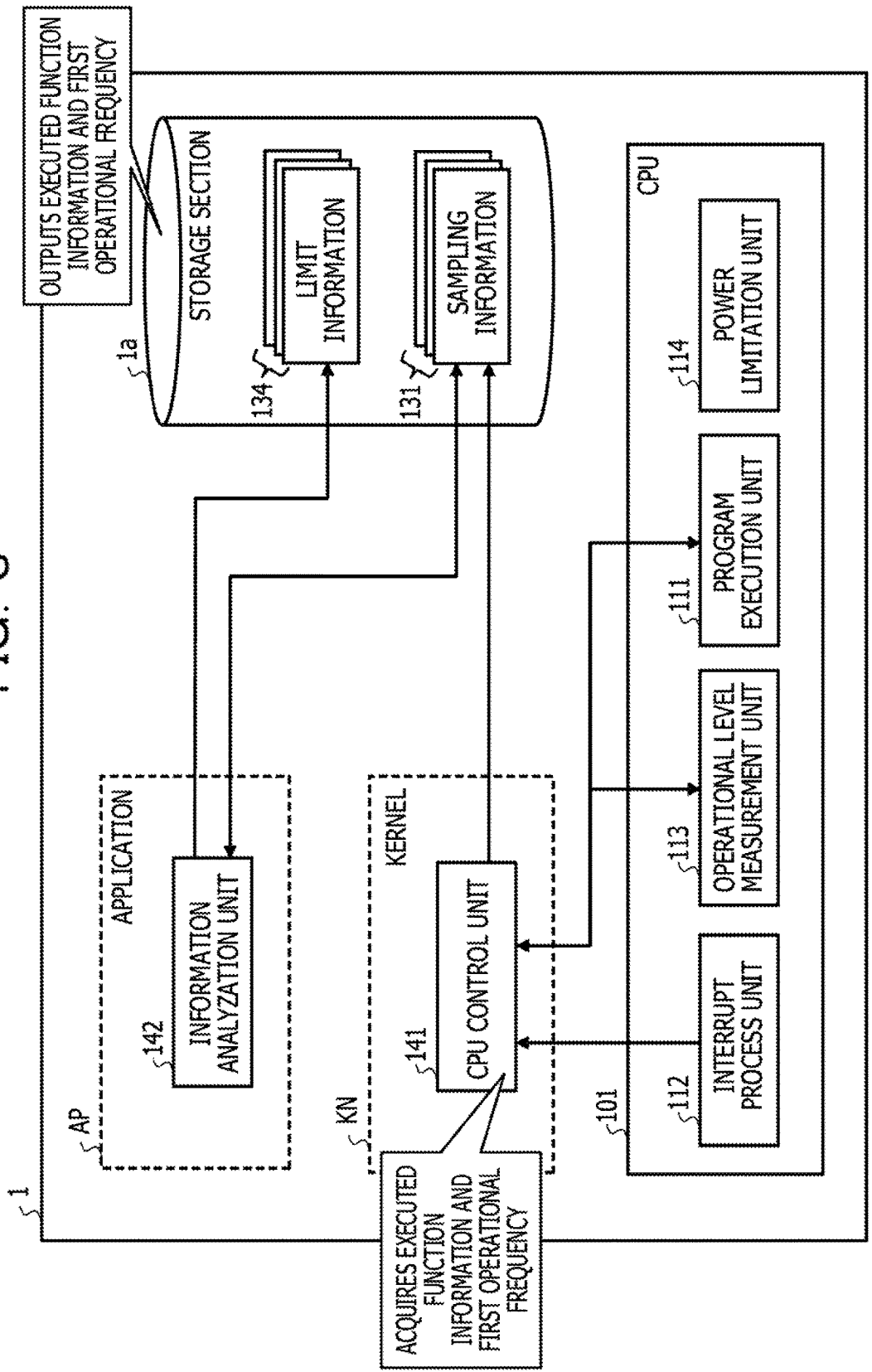

FIGS. 1, 2, and 3 are diagrams illustrating an overall configuration of an information processing device 1. The information processing device 1 illustrated in FIGS. 1 to 3 includes a CPU 101 and a storage section 1a (hereinafter also referred to as storage device 1a).

The information processing device illustrated in FIG. 1 executes power profiling on a program to be analyzed and executed by the CPU 101 (or a program execution unit 111 that is a section included in the CPU 101). In the information processing device 1 illustrated in FIG. 1, an information acquisition unit 121, which is achieved by causing the CPU 101 and a kernel KN to collaborate with each other, acquires the amount of power consumed for executing each of functions included in the program to be analyzed, based on the execution, by the program execution unit 111, of the program to be analyzed, for example. The kernel KN is a program that constitutes the central core of an operating system (OS). Then, the information acquisition unit 121 generates sampling data 131 (hereinafter also referred to as sampling information 131) from information including the acquired amounts of consumed power and causes the sampling data 131 to be stored in the storage section 1a, for example.

After that, in the information processing device 1 illustrated in FIG. 1, an information analyzing section 122 that is achieved by causing the CPU 101 to collaborate with an application AP executed on the kernel KN executes the power profiling based on the sampling information 131 stored in the storage section 1a. Thus, the operator may use the information processing device 1 to analyze characteristics of the amount of power consumed for executing each of the functions included in the program to be analyzed. An example of the sampling information 131 is described later.

Example of Process by Information Acquisition Unit

Next, an example of a process by the information acquisition unit 121 is described.

The CPU 101 illustrated in FIG. 1 includes the program execution unit 111, an interrupt process unit 112, and a power limitation unit 114. The interrupt process unit 112 notifies the information acquisition unit 121 that an interrupt has been generated. The power limitation unit 114 limits the amount of power consumed by the CPU 101 and executes other operations. The interrupt process unit 112 uses a Performance Monitoring Counter (PMC) feature included in the CPU 101, for example. In addition, the power limitation unit 114 uses a Running Average Power Limit (RAPL) feature included in the CPU 101, for example.

In the example illustrated in FIG. 1, the interrupt process unit 112 notifies, at predetermined time intervals (of, for example, 10 milliseconds), the information acquisition unit 121 that the interrupt has been generated, for example. The information acquisition unit 121 receives the notification from the interrupt process unit 112, accesses the program execution unit 111, and acquires execution information (instruction addresses) on the program currently executed by the program execution unit 111 and to be analyzed. In addition, the information acquisition unit 121 acquires a process ID generated in the kernel KN. In addition, the information acquisition unit 121 accesses the power limitation unit 114 and acquires the amount of power currently consumed by the CPU 101, for example. Thus, the operator may generate the sampling information 131.

In order to acquire the aforementioned power profile, the operator performs sampling on the CPU 101 at predetermined time intervals for the execution of the program to be analyzed, for example. It is preferable that the predetermined time intervals at which the operator performs the sampling be relatively short. This is due to the fact that if the sampling time intervals are long, various functions are executed after previous sampling and the amounts of power recently sampled and consumed by program execution units may be inaccurate. In addition, if the sampling time intervals are long, it may be difficult to sample a function to be executed in a short time period, for example.

However, if the sampling time intervals set in the interrupt process unit 112 are short, the frequency at which the CPU 101 is interrupted is high. Thus, the performance of the information processing device 1 may be reduced due to the interrupt for the execution of the sampling, and a behavior that is different from that expected by the operator may occur, as illustrated in FIG. 3.

In addition, if the sampling time intervals are short, the amount of information obtained by the sampling becomes large. Thus, if a size of storing the obtained information is large or a time period for executing the program to be analyzed is long, it may be difficult to acquire the power profile of the overall program.

A CPU control unit 141 that is included in the information processing device 1 according to the embodiment sets, in the CPU 101, a limit value (hereinafter also referred to as first limit value) for power consumed for executing the program to be analyzed, as illustrated in FIG. 2. Then, the CPU control unit 141 controls the CPU 101 to execute the program to be analyzed.

In addition, as illustrated in FIG. 3, the CPU control unit 141 controls the CPU 101 to enable the generation of interrupts during the execution of the program to be analyzed, associates executed function information indicating a currently executed function with an operational frequency (hereinafter also referred to as first operational frequency) of the CPU 101 during the execution of the program to be analyzed, and acquires the executed function information and the operational frequency. Then, the CPU control unit 141 generates the sampling information 131 from the acquired information and causes the generated sampling information 131 to be stored in the storage section 1a or the like. After that, an information analyzation unit 142 (hereinafter also referred to as determiner) that is included in the information processing device 1 associates, based on the generated sampling information 131, the executed function information with limit information indicating whether or not the first operational frequency is limited by the setting of the first limit value, and the information analyzation unit 142 outputs the limit information and the executed function information to the storage device.

Specifically, during the execution of the program to be analyzed, if the consumed power reaches the first limit value, the power limitation unit 114 of the CPU 101 adjusts the operational frequency of the CPU 101 during the execution of the program to be analyzed. The power limitation unit 114 suppresses the operational frequency of the CPU 101 during the execution of the program to be analyzed so that the consumed power does not exceed the first limit value.

Thus, the operational frequency when the consumed power reaches the first limit value during the execution of the program to be analyzed is lower than the operational frequency when the consumed power does not reach the first limit value during the execution of the program to be analyzed. The information analyzation unit 142 compares a first operational frequency of the CPU 101 during the execution of the program to be analyzed with an operational frequency (hereinafter also referred to as second operational frequency) of the CPU 101 when the consumed power does not reach the first limit value, for example. If the first operational frequency is lower than the second operational frequency, the information analyzation unit 142 determines that the consumed power has reached the first limit value during the execution of the program to be analyzed.

Thus, the information processing device 1 may determine whether or not power (consumed power that is not limited by the first limit value) consumed for executing a function during the acquisition of the first operational frequency is higher than the first limit value.

In addition, when the CPU 101 suppresses the operational frequency of the CPU 101 during the execution of the program to be analyzed, a process time of a function executed during the suppression of the operational frequency increases. Thus, the information processing device 1 may increase the probability at which the sampling is executed during the execution of a function that causes power consumed for executing the function to be higher than the first limit value in a case where the consumed power is not limited.

Thus, the information processing device 1 may identify a function causing power consumed for executing the function to exceed the predetermined threshold without reducing the sampling time intervals during the execution of the program to be analyzed. In addition, the information processing device 1 may suppress the amount of sampled information (information to be stored in the storage section 1a or the like).

Hardware Configuration of Information Processing Device

Figure 4:
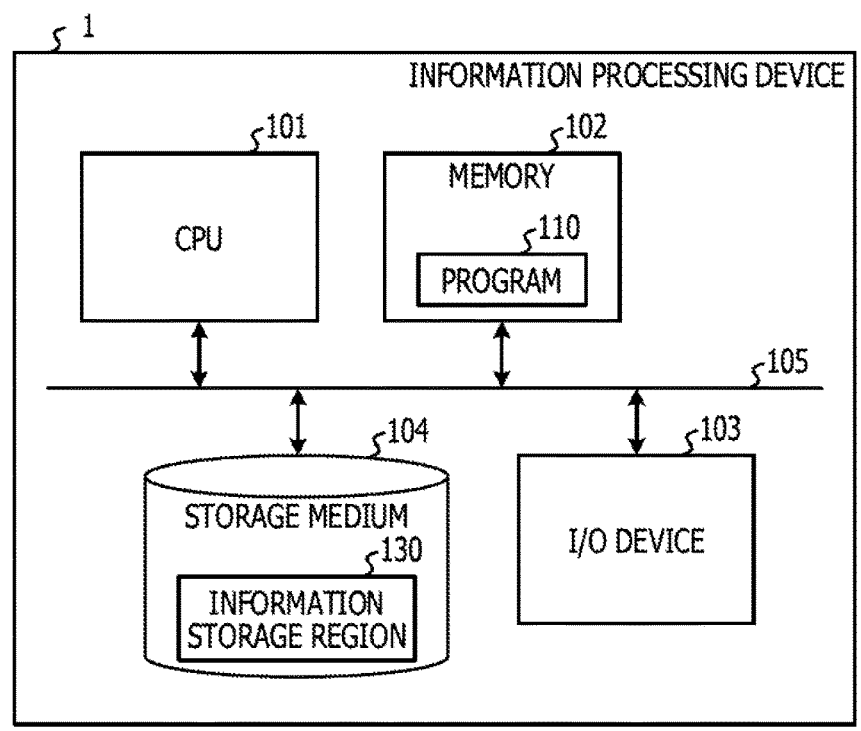
FIG. 4 is a diagram describing a hardware configuration of the information processing device.

Next, a hardware configuration of the information processing device 1 is described. FIG. 4 is a diagram describing the hardware configuration of the information processing device 1.

The information processing device 1 includes the CPU 101, a memory 102, an external interface circuit (I/O device) 103, and a storage medium 104. The CPU 101, the memory 102, the external interface circuit 103, and the storage medium 104 are coupled to each other via a bus 105. The CPU 101 is an example of a processor.

The storage medium 104 stores, in a program storage region (not illustrated) within the storage medium 104, a program 110 for executing a process (hereinafter also referred to as operational state collection process) of identifying a function that causes consumed power to exceed the predetermined threshold.

The CPU 101 loads the program 110 into the memory 102 from the storage medium 104 upon the execution of the program 110 and collaborates with the program 110, thereby executing the operational state collection process.

The storage medium 104 includes an information storage region 130 (hereinafter also referred to as storage section 130 or storage device 130) for storing information to be used for the execution of the operational state collection process, for example. The external interface circuit 103 communicates with another information processing device (for example, a physical machine or a virtual machine), for example. The storage section 1a described with reference to FIG. 1 may correspond to the information storage region 130.

Next, functions included in the CPU 101 are described. The CPU 101 illustrated in FIG. 2 and the other drawings includes the program execution unit 111, the interrupt process unit 112, an operational level measurement unit 113, and the power limitation unit 114.

The operational level measurement unit 113 refers to, for example, a predetermined register included in the CPU 101 and acquires, as a current operational level of the CPU 101, a P-state that is information associated with the current operational frequency of the CPU 101.

When the first limit value for consumed power is set, the power limitation unit 114 controls the program execution unit 111 so that power consumed by causing the program execution unit 111 to execute the program to be analyzed does not exceed the first limit value. The power limitation unit 114 controls the program execution unit 111 by referencing, for example, a predetermined register (hereinafter also referred to as first register) in which the first limit value has been set.

Software Configuration of Information Processing Device

Next, functions of the CPU control unit 141 and information analyzation unit 142 of the information processing device 1 are described. The CPU 101 functions as the CPU control unit 141 and the information analyzation unit 142 by collaborating with the program 110, as described with reference to FIG. 2 and the other drawings.

The CPU control unit 141 includes a setting section configured to set, in the first register, the first limit value for power consumed for executing the program to be analyzed. When the operator enters the first limit value, the setting section of the CPU control unit 141 sets the first limit value in the first register, for example. Thus, the power limitation unit 114 may suppress the operational frequency so that the power consumed for executing the program to be analyzed does not exceed the first limit value.

The first limit value may be a value obtained by calculation using a time period in which the operational frequency is suppressed to cause the consumed power to become equal to or lower than the first limit value and a limit value for the average amount of power consumed in the time period, for example. In this case, the power limitation unit 114 may suppress the operational frequency by using a value obtained by dividing the limit value for the average amount of the consumed power by the time period.

The CPU control unit 141 includes an execution controller configured to control the CPU 101 to execute the program to be analyzed. The CPU control unit 141 includes an acquisition unit that controls the CPU 101 to enable the generation of interrupts during the execution of the program to be analyzed, associates executed function information 133 indicating a currently executed function with the operational level (hereinafter also referred to as first operational level) of the CPU 101 during the execution of the program to be analyzed, and acquires the executed function information 133 and the first operational level. The acquisition unit of the CPU control unit 141 refers to association information 135 in which operational levels able to be set in the CPU 101 are associated with operational frequencies able to be set in the CPU 101, and acquires, as the first operational frequency, an operational frequency associated with the first operational level, for example.

The CPU control unit 141 includes an output unit. The output unit associates the executed function information 133 with limit information 134 indicating whether or not the first operational frequency is limited by the setting of the first limit value, and the output unit outputs the limit information 134 and the executed function information 133 to the information storage region 130. The limit information 134 indicates whether or not the first operational frequency of the CPU 101 is limited by the setting of the first limit value or whether or not the consumed power has reached the first limit value.

The information analyzation unit 142 determines, based on the first operational frequency acquired by the CPU control unit 141, whether or not the consumed power has reached the first limit value during the execution of the program to be analyzed.

The information analyzation unit 142 compares the first operational frequency acquired by the CPU control unit 141 with a second operational frequency of the CPU 101 during the execution of the program to be analyzed in a case where the consumed power does not reach the first limit value, for example. If the first operational frequency is lower than the second operational frequency, the information analyzation unit 142 determines that the consumed power has reached the first limit value during the execution of the program to be analyzed. Specifically, in this case, the information analyzation unit 142 determines, as a function causing the consumed power to exceed the first limit value in the case where the power limitation unit 114 is inactivated (the first limit value is not set), the function indicated in the executed function information 133 acquired together with the first operational frequency from the CPU control unit 141. If the first operational frequency is not lower than the second operational frequency, the information analyzation unit 142 determines that the consumed power has not reached the first limit value during the execution of the program to be analyzed. Specifically, in this case, the information analyzation unit 142 determines, as a function causing the consumed power to be equal to or lower than the first limit value in a case where the power limitation unit 114 is inactivated (the first limit value is not set), the function indicated in the executed function information 133 acquired together with the first operational frequency from the CPU control unit 141.

The CPU control unit 141 may acquire a process ID and an instruction address that indicate the currently executed function. In this case, the information analyzation unit 142 may refer function information 132 in which instruction addresses of functions are associated with function names, and the information analyzation unit 142 may identify, as the executed function information 133, a function name associated with the instruction address acquired by the CPU control unit 141.

Outline of Embodiment

Figure 5:
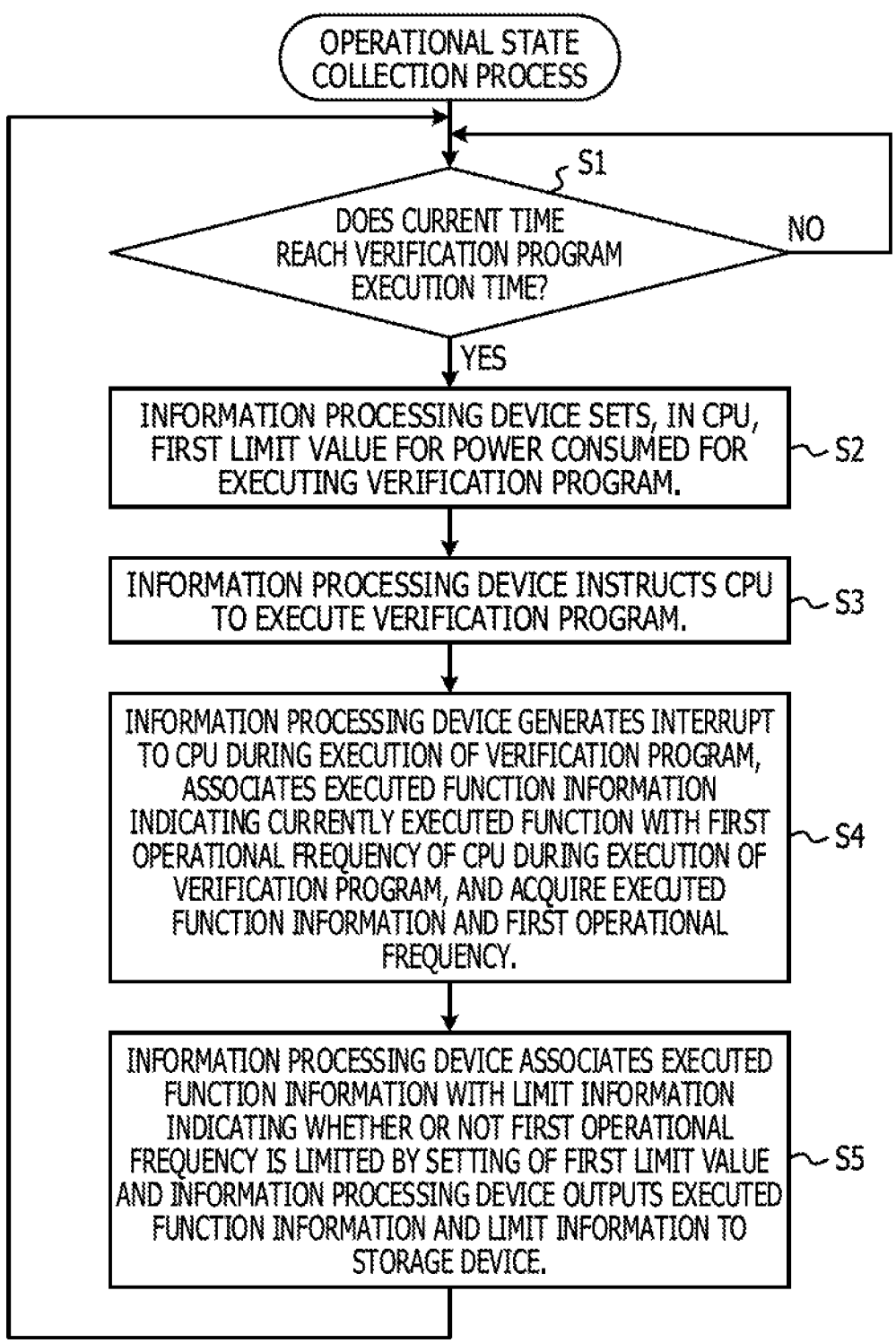
FIG. 5 is a flowchart describing the outline of an operational state collection process according to an embodiment.
Figure 6:
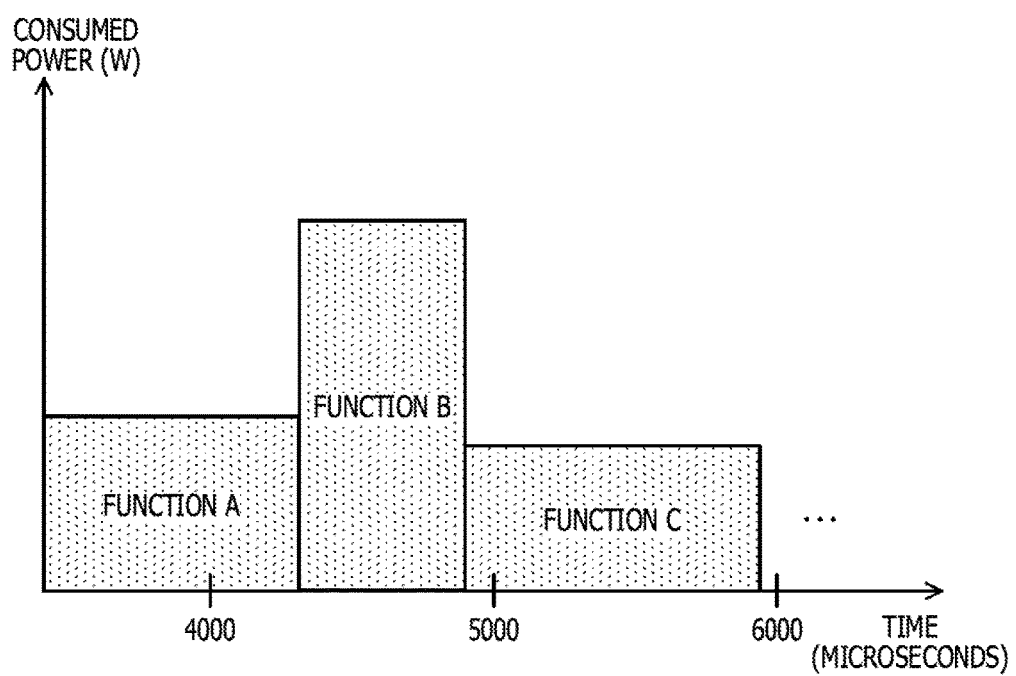
FIGS. 6 and 7 are diagrams describing the outline of the operational state collection process according to the embodiment.
Figure 7:
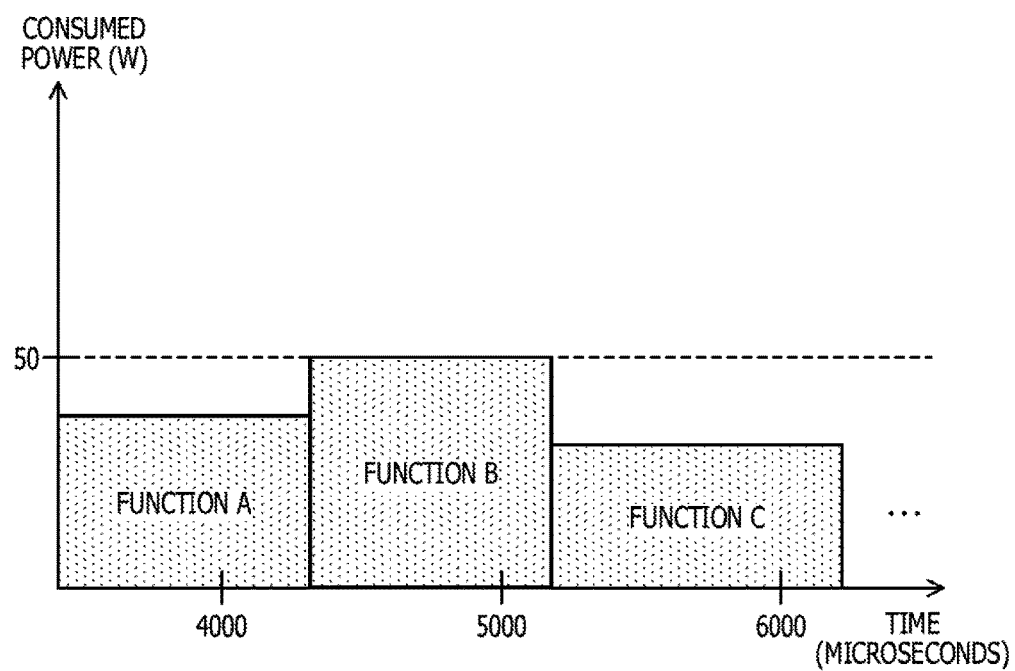
Figure 8:
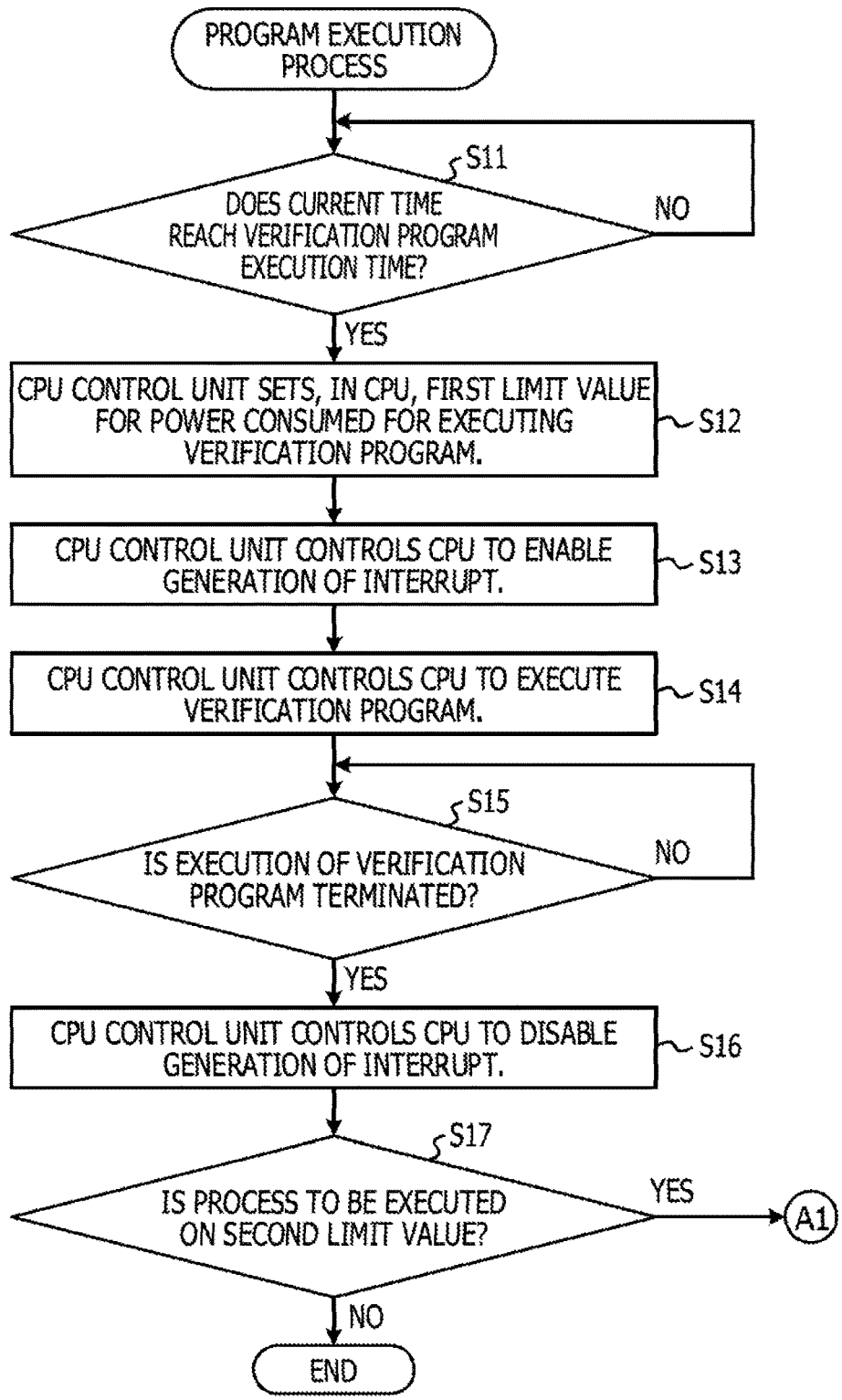
FIGS. 8, 9, 10, 11, 12, and 13 are flowcharts describing details of the operational state collection process according to the embodiment.

Next, the outline of the embodiment is described. FIG. 5 is a flowchart describing the outline of the operational state collection process according to the embodiment. FIGS. 6 and 7 are diagrams describing the outline of the operational state collection process according to the embodiment. The operational state collection process of FIG. 5 is described with reference to FIGS. 6 and 7.

The information processing device 1 stands by until a program execution time (NO in S1), as illustrated in FIG. 5. The program execution time may be when the operator enters the first limit value for power consumed for executing the program to be analyzed, for example. When the current time reaches the program execution time (YES in S1), the information processing device 1 sets, in the CPU 101, the first limit value for power consumed for executing the program to be analyzed (in S2). The information processing device 1 sets the first limit value in the first register, for example. Specifically, the information processing device 1 sets the first limit value so that, if the power consumed for executing the program to be analyzed exceeds the first limit value, the operational frequency of the CPU 101 is suppressed.

After that, the information processing device 1 controls the CPU 101 to execute the program to be analyzed (in S3). Then, the information processing device 1 controls the CPU 101 to enable the generation of interrupts during the execution of the program to be analyzed, associates the executed function information 133 indicating a currently executed function with the first operational frequency of the CPU 101 during the execution of the program to be analyzed, and acquires the executed function information 133 and the operational frequency of the CPU 101 (in S4). In addition, the information processing device 1 associates the executed function information 133 with the limit information 134 indicating whether or not the first operational frequency is limited by the setting of the first limit value, and the information processing device 1 outputs (stores) the executed function information 133 and the limit information 134 to (in) the storage device 130 (in S5).

The information processing device 1 associates the executed function information 133 during the execution of the program to be analyzed with the first operational level of the CPU 101 and acquires the executed function information 133 and the first operational level of the CPU 101. For example, the information processing device 1 acquires the executed function information 133 and the first operational level at predetermined time intervals. Then, the information processing device 1 generates the sampling information 131 including the acquired executed function information 133 and the acquired first operational level and stores the generated sampling information 131 in the information storage region 130.

After that, the information processing device 1 refers to the association information 135 and acquires, as the first operational frequency, an operational frequency associated with the first operational level included in the sampling information 131. Then, the information processing device 1 determines, based on the acquired first operational frequency, whether or not the consumed power has reached the first limit value during the execution of the program to be analyzed. For example, the information processing device 1 compares the first operational frequency acquired by the CPU control unit 141 with the second operational frequency of the CPU 101 during the execution of the program to be analyzed in the case where the consumed power has not reached the first limit value. As a result, if the first operational frequency is lower than the second operational frequency, the information analyzation unit 142 determines that the consumed power has reached the first limit value during the execution of the program to be analyzed. If the first operational frequency is not lower than the second operational frequency, the information analyzation unit 142 determines that the consumed power has not reached the first limit value during the execution of the program to be analyzed.

If the consumed power has reached the first limit value during the execution of the program to be analyzed, the power limitation unit 114 of the CPU 101 suppresses the operational frequency of the CPU 101 during the execution of the program to be analyzed. Thus, if the first operational frequency is lower than the second operational frequency, the information processing device 1 may determine that the consumed power has reached the first limit value during the execution of the program to be analyzed. The relationship between the consumed power and the first limit value is described below.

FIGS. 6 and 7 are diagrams describing the relationship between the consumed power and the first limit value. In FIGS. 6 and 7, the abscissas indicate time (units of time are microseconds), and the ordinates indicate consumed power (units of power are watts (W)). FIGS. 6 and 7 illustrate examples indicating cases where a function A, a function B, and a function C are chronologically executed in the program to be analyzed.

In the example illustrated in FIG. 6, the first limit value is not set in the CPU 101. Thus, the CPU 101 executes the functions A, B, and C without a limit on the consumed power.

On the other hand, in the example illustrated in FIG. 7, the first limit value (50 (W)) is set in the CPU 101. Thus, in this case, the power limitation unit 114 controls the operational frequency so that power consumed for executing each of the functions does not exceed 50 (W). In addition, power consumed by executing the function B in the example illustrated in FIG. 7 is suppressed more than power consumed by executing the function B in the case described with reference to FIG. 6. Specifically, the example illustrated in FIG. 7 indicates a state in which the operational frequency during the execution of the function B is suppressed by the power limitation unit 114 to an operational frequency lower than operational frequencies during the execution of the functions A and C.

Thus, the information processing device 1 compares the operational frequencies during the execution of the functions A, B, and C, thereby identifying that a function that causes power consumed during the execution of the function to reach the first limit value (50 (W)) is the function B.

A time period for executing the function B in the example illustrated in FIG. 7 is longer than a time period for executing the function B in the example illustrated in FIG. 6. Thus, if the power limitation unit 114 suppresses the operational frequency of the CPU 101 during the execution of the program to be analyzed, a process time of the function executed during the suppression of the operational frequency is long. Thus, the information processing device 1 may increase the probability at which the sampling is executed during the execution of a function that causes power consumed during the execution of the function to reach the first limit value.

Then, the information processing device 1 outputs (stores), to (in) the information storage region 130, the executed function information 133 acquired during the execution of the program to be analyzed and the limit information 134 indicating whether or not the operational frequency of the CPU 101 is limited by the setting of the first limit value during the execution of the function indicated in the executed function information 133.

In the aforementioned manner, the CPU control unit 141 of the information processing device 1 according to the embodiment sets, in the CPU 101, the first limit value for power consumed for executing the program to be analyzed. Then, the CPU control unit 141 controls the CPU 101 to execute the program to be analyzed.

The CPU control unit 141 controls the CPU 101 to enable the generation of interrupts during the execution of the program to be analyzed, associates the executed function information indicating the currently executed function with the first operational frequency of the CPU during the execution of the program to be analyzed, and acquires the executed function information and the first operational frequency, as illustrated in FIG. 3. Then, the CPU control unit 141 generates the sampling information 131 from the acquired information and causes the generated sampling information 131 to be stored in the storage section 1a or the like. After that, the information analyzation unit 142 of the information processing device 1 associates, based on the generated sampling information 131, the executed function information with the limit information 134 indicating whether or not the first operational frequency is limited by the setting of the first limit value, and the information analyzation unit 142 outputs the executed function information and the limit information to the storage device.

Specifically, the information processing device 1 executes the setting to suppress the operational frequency during the execution of a function causing power consumed during the execution of the function to exceed the predetermined threshold. Thus, the information processing device 1 refers to information sampled during the execution of each of functions and may determine whether or not power consumed for executing each of the functions is higher than the predetermined threshold.

In addition, the information processing device 1 suppresses the operational frequency during the execution of a function causing power consumed during the execution of the function to exceed the predetermined threshold, thereby increasing a time period for executing the function causing the power consumed during the execution of the function to exceed the predetermined threshold. Thus, the information processing device 1 may increase the probability at which the sampling is executed during the execution of the function causing the power consumed during the execution of the function to exceed the predetermined threshold.

Thus, the information processing device 1 may identify a function causing power consumed for executing the function to exceed the predetermined threshold without reducing the sampling time intervals during the execution of the program to be analyzed. Then, the information processing device 1 may suppress the amount of the generated sampling information 131.

Details of Embodiment

Next, details of the embodiment are described. FIGS. 8, 9, 10, 11, 12, and 13 are flowcharts describing details of the operational state collection process according to the embodiment. FIGS. 14 to 22 are diagrams describing the details of the operational state collection process according to the embodiment. The operational state collection process of FIGS. 8 to 13 are described with reference to FIGS. 14 to 22.

Program Execution Process

First, a process (hereinafter also referred to as program execution process) of executing, by the CPU control unit 141, the program to be analyzed is described.

The CPU control unit 141 of the information processing device 1 stands by until the program execution time (NO in S11). When the current time reaches the program execution time (YES in S11), the CPU control unit 141 sets, in the CPU 101, the first limit value for power consumed for executing the program to be analyzed (in S12). In this case, the CPU control unit 141 sets the first limit value in the power limitation unit 114.

The CPU control unit 141 controls the CPU 101 to enable the generation of interrupts (in S13). In this case, the CPU control unit 141 controls the interrupt process unit 112 to enable the generation of interrupts. Then, the CPU control unit 141 controls the CPU 101 to execute the program to be analyzed (in S14). In this case, the CPU control unit 141 controls the program execution unit 111 to execute the program to be analyzed.

Thus, the CPU control unit 141 may acquire information to be used to generate the sampling information 131, as described later.

After that, the CPU control unit 141 stands by until the termination of the execution of the program to be analyzed (NO in S15). When the execution of the program to be analyzed is terminated (YES in S15), the CPU control unit 141 controls the CPU 101 to disable the generation of interrupts (in S16). In this case, the CPU control unit 141 controls the interrupt process unit 112 to disable the generation of interrupts.

After the process of S16, the CPU control unit 141 determines whether or not the same process as that executed on the first limit value is to be executed on a limit value (hereinafter also referred to as second limit value) that is larger than the first limit value (in S17). If the same process as that executed on the first limit value is not to be executed on the second limit value (NO in S17), the CPU control unit 141 terminates the program execution process. Details of the process of S17 are described later. A process to be executed if the same process as that executed on the first limit value is to be executed on the second limit value is described later.

Details of Operational State Collection Process

Next, details of the operational state collection process are described.

Figure 9:
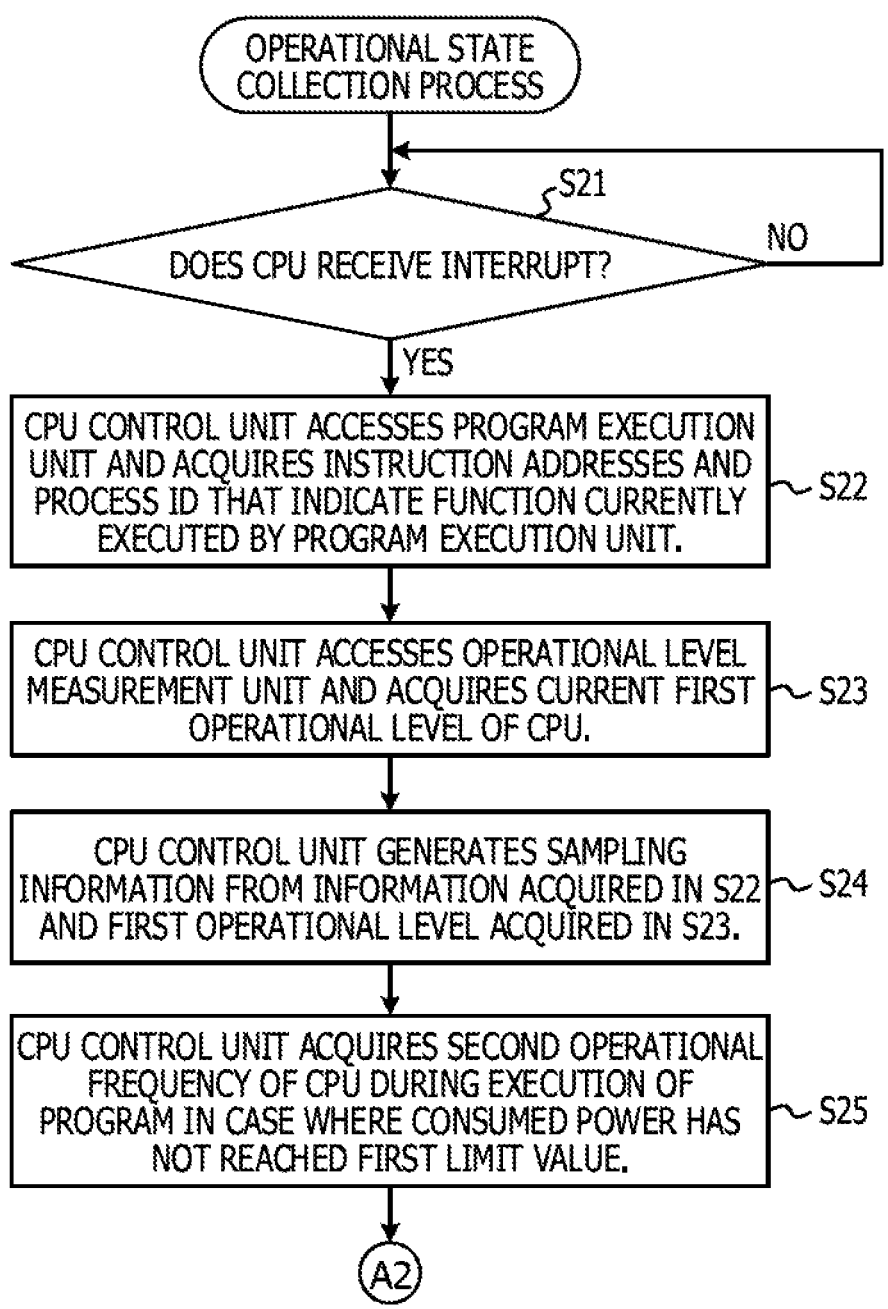

The CPU control unit 141 stands by until the interrupt process unit 112 receives an interrupt (NO in S21), as illustrated in FIG. 9. When the interrupt process unit 112 receives the interrupt (YES in S21), the CPU control unit 141 accesses the program execution unit 111 and acquires instruction addresses and a process ID that indicate a function currently executed by the program execution unit 111 (in S22).

In this case, the CPU control unit 141 accesses the operational level measurement unit 113 and acquires the first operational level that is the current operational level of the CPU 101 (in S23). Then, the CPU control unit 141 generates the sampling information 131 from the information acquired in the process of S22 and the first operational level acquired in the process of S23 (in S24). An example of the sampling information 131 is described below.

Example of Sampling Information

FIG. 14 is a diagram describing the example of the sampling information 131. The sampling information 131 illustrated in FIG. 14 includes, as items, "information IDs" identifying information included in the sampling information 131 and a "process ID" identifying the ID (process ID acquired in S22) of a process executed by the CPU 101. In addition, the sampling information 131 illustrated in FIG. 14 includes, as items, "instruction addresses" identifying the addresses (instruction addresses acquired in S22) of storage destinations of instructions executed by the CPU 101 and "operational levels" indicating operational levels to which the first operational level (first operational level acquired in S23) of the CPU 101 is set. Furthermore, the sampling information 131 illustrated in FIG. 14 includes, as an item, "times" indicating times when the information included in the sampling information 131 is generated.

In information whose "information ID" is "1" and that is included in the sampling information 131 illustrated in FIG. 14, "A" is set as the "process ID", "0x00003121" is set as a "instruction address", and "0x1400" is set as an "operational level". In addition, in the information whose "information ID" is "1" and that is included in the sampling information 131 illustrated in FIG. 14, "10:10:00.0000" is set as a "time".

Specifically, the information whose "information ID" is "1" indicates that a function whose "process ID" is "A" and whose "instruction address" is "0x00003121" is executed at the "time" identified by "10:10:00.0000". In addition, the information whose "information ID" is "1" indicates that the operational level at the time identified by "10:10:00.0000" is "0x1400". A description of the other information included in the sampling information 131 illustrated in FIG. 14 is omitted.

Return to FIG. 9. The CPU control unit 141 acquires the second operational frequency of the CPU 101 during the execution of the program to be analyzed in the case where the consumed power has not reached the first limit value (in S25). Specifically, the CPU control unit 141 acquires, as the second operational frequency, the operational frequency of the CPU 101 during the execution of the program to be analyzed in the case where the consumed power is not limited by the power limitation unit 114. The second operational frequency may be measured by the operator and stored in the information storage region 130 in advance, for example. The following description assumes that the second operational frequency is 2.0 GHz.

Figure 10:
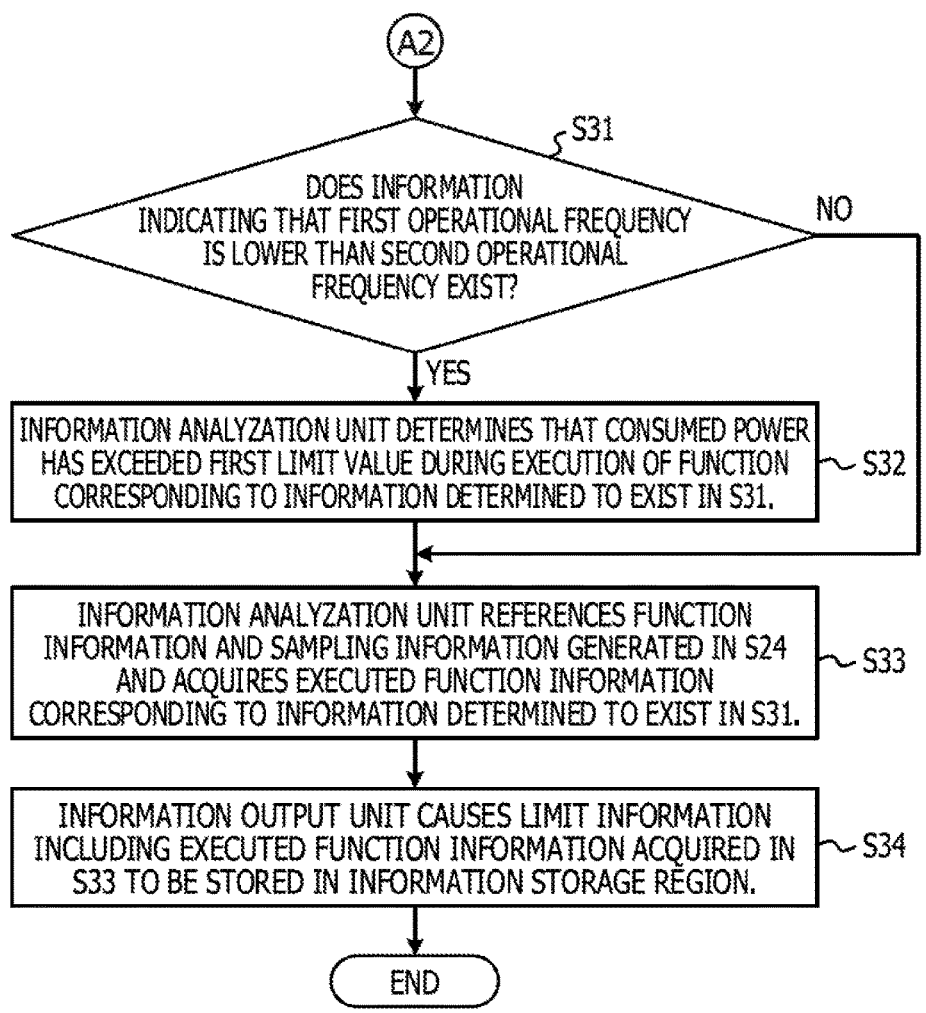

Then, the CPU control unit 141 determines whether or not information indicating that the first operational frequency is lower than the second operational frequency exists in the sampling information 131 generated in the process of S24 (in S31), as illustrated in FIG. 10.

The CPU control unit 141 refers to the association information 135 and acquires, as the first operational frequency, an operational frequency associated with the first operational level included in the sampling information 131 generated in the process of S24. An example of the association information 135 is described below.

Example of Association Information

FIG. 15 is a diagram describing the example of the association information 135. The association information 135 illustrated in FIG. 15 includes, as items, "information IDs" identifying information included in the association information 135, "operational levels" indicating operational levels to which the operational level of the CPU 101 is set, and "operational frequencies" indicating operational frequencies to which the operational frequency of the CPU 101 is set.

In information whose "information ID" is "1" and that is included in the association information 135 illustrated in FIG. 15, "0x1400" is set as an "operational level" and "2.0 (GHz)" is set as an "operational frequency". A description of the other information included in the association information 135 illustrated in FIG. 15 is omitted.

Thus, in the process of S31, the CPU control unit 141 identifies "2.0 (GHz)", "1.8 (GHz)", "2.0 (GHz)", "1.7 (GHz)", and "2.0 (GHz)" as operational frequencies associated with "operational levels" of the information whose "information IDs" are "1" to "5" in the sampling information 131 illustrated in FIG. 14. Thus, the information analyzation unit 142 determines that the "operational frequencies" associated with the information set as the "operational levels" of the information whose "information IDs" are "2" and "4" in the sampling information 131 illustrated in FIG. 14 are lower than the second operational frequency.

Return to FIG. 10. If the information indicating that the first operational frequency is lower than the second operational frequency exists (YES in S31), the information analyzation unit 142 determines that the consumed power has exceeded the first limit value during the execution of a function corresponding to the information determined to exist in the process of S31 (in S32). On the other hand, if the information indicating that the first operational frequency is lower than the second operational frequency does not exist (NO in S31), the information analyzation unit 142 does not execute the process of S32.

The information analyzation unit 142 determines that the consumed power has exceeded the first limit value during the execution of functions corresponding to the information whose "information IDs" are "2" and "4" in the sampling information 131 illustrated in FIG. 14.

After that, the information analyzation unit 142 refers to the sampling information 131 generated in the process of S24 and the function information 132 and acquires the executed function information 133 corresponding to the information determined to exist in the process of S31 (in S33). An example of the function information 132 is described below.

Example of Function Information

FIG. 16 is a diagram describing the example of the function information 132. The function information 132 illustrated in FIG. 16 includes, as items, "information IDs" identifying information included in the function information 132 and "instruction addresses" identifying storage destinations of instructions. In addition, the function information 132 illustrated in FIG. 16 includes, as an item, "function names" identifying the names of the functions included in the program to be analyzed.

In information whose "information ID" is "1" and that is included in the function information 132 illustrated in FIG. 16, "0x00003000-0x00004fff" is set as "instruction addresses" and a "function A" is set as a "function name". Specifically, the information whose "information ID" is "1" indicates that the function whose "function name" is "function A" is stored in a region (memory region) whose "instruction addresses" are in a range of "0x00003000" to "0x00004fff". A description of the other information included in the function information 132 illustrated in FIG. 16 is omitted.

Thus, in the process of S33, the information analyzation unit 142 refers to the sampling information 131 illustrated in FIG. 14 and identifies "0x00006b33" and "0x00009002" that are information set as "instruction addresses" of the information whose "information IDs" are "2" and "4", for example. Then, the CPU control unit 141 refers to the function information 132 illustrated in FIG. 16 and acquires, as the executed function information 132, the "function B" and the "function C" that are information set as "function names" of information in which instruction addresses including "0x00006b33" and "0x00009002" are set as "instruction addresses".

Return to FIG. 10. The information output unit 124 causes the limit information 134 including the executed function information 133 acquired in the process of S33 to be stored in the information storage region 130 (in S34). Examples of the limit information 134 are described below.

Examples of Limit Information

FIGS. 17 and 22 are diagrams describing the examples of the limit information 134. The limit information 134 illustrated in FIGS. 17 and 22 includes, as items, "information IDs" identifying information included in the limit information 134 and "function names" identifying the executed function information 133 acquired in the process of S33. The following description assumes that the information output unit 124 outputs, as the limit information 134, only information on functions causing consumed power to reach the first limit value during the execution of the functions.

In information whose "information ID" is "1" and that is included in the limit information 134 illustrated in FIG. 17, the "function B" is set as a "function name". In information whose "information ID" is "2" and that is included in the limit information 134 illustrated in FIG. 17, the "function C" is set as a "function name". Specifically, the limit information 134 illustrated in FIG. 17 indicates that functions that cause the consumed power to reach the first limit value during the execution of the functions are the "function B" and the "function C". FIG. 22 is described later.

Details of Process of S17

Next, the details of the process of S17 are described. The information analyzation unit 142 refers to information set by the operator in the information storage region 130 and determines whether or not the same process as that executed on the first limit value is to be executed on the second limit value in the process of S17, for example. A case where it is effective to execute, on the second limit value, the same process as that executed on the first limit value is described below.

Figure 18:
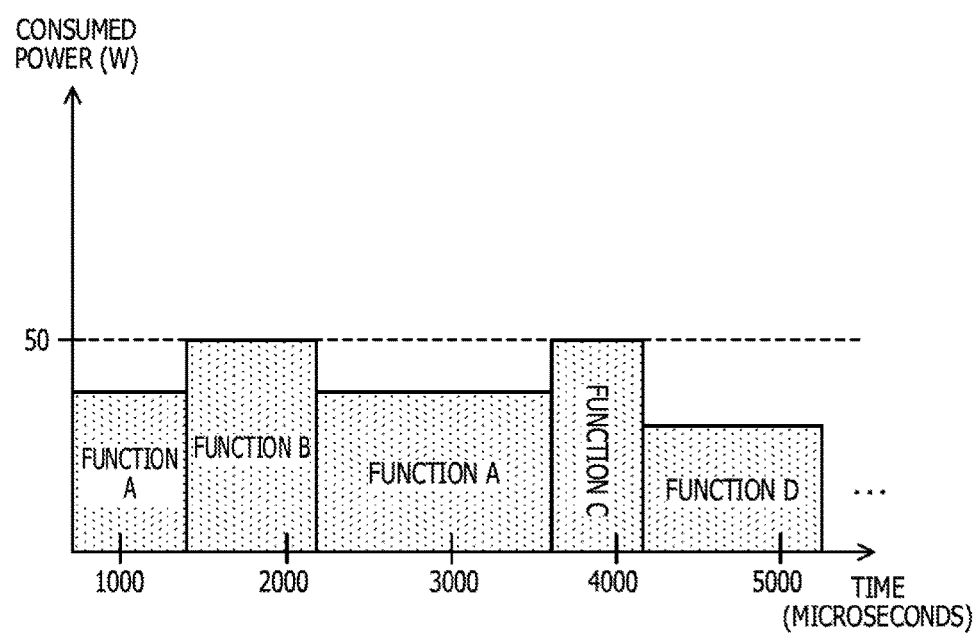
FIGS. 18 and 19 are diagrams describing a case where it is effective to execute, on a second limit value, the same process as that executed on a first limit value.
Figure 19:
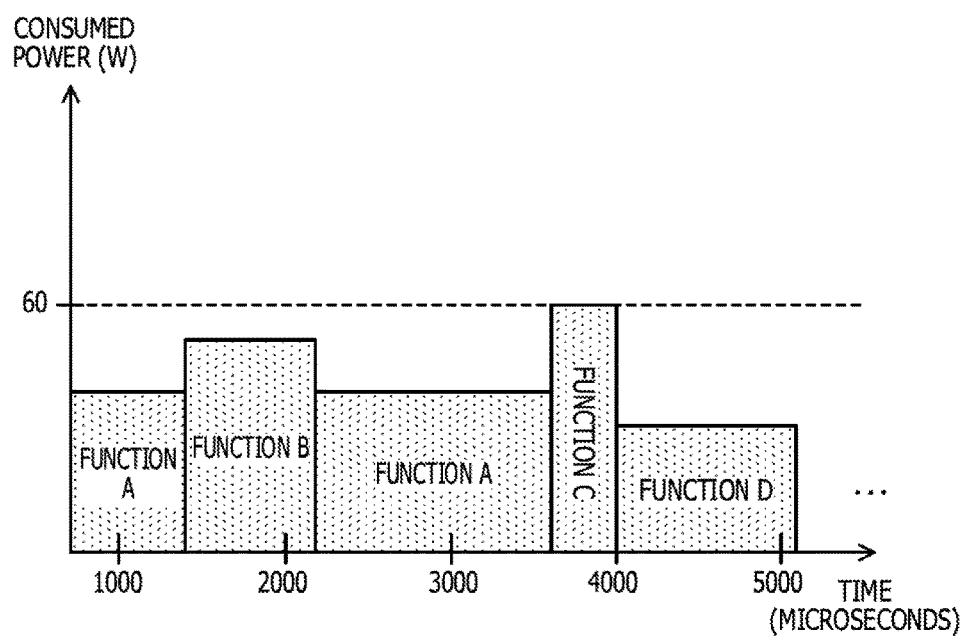

Case where it is Effective to Execute, on Second Limit Value, Same Process as that Executed on First Limit Value FIGS. 18 and 19 are diagrams describing the case where it is effective to execute, on the second limit value, the same process as that executed on the first limit value. FIG. 18 is a diagram describing the relationship between the consumed power and the first limit value in a case where the first limit value is 50 (W). FIG. 19 is a diagram describing the relationship between the consumed power and the second limit value in a case where the second limit value is 60 (W).

In the example illustrated in FIG. 18, power consumed for executing the function B and power consumed for executing the function C are limited so that the consumed power does not exceed the first limit value. The example illustrated in FIG. 18 indicates that the consumed for executing the function B and the power consumed for executing the function C exceed 50 (W) in the case where the consumed power is not limited by the power limitation unit 114. In this case, however, the information processing device 1 may not be able to determine whether the power consumed for executing the function B or the power consumed for executing the function C is higher than the other.

In the example illustrated in FIG. 19, among the power consumed for executing the functions B and C, only the power consumed for executing the function C is limited to a value equal to or lower than the second limit value. Specifically, the example illustrated in FIG. 19 indicates that the power consumed for executing the function C exceeds 60 (W) in the case where the consumed power is not limited by the power limitation unit 114.

Thus, the information processing device 1 may refer the details illustrated in FIGS. 18 and 19 and determine that the power consumed for executing the function C is equal to or higher than 60 (W) in the case where the consumed power is not limited by the power limitation unit 114. In addition, the information processing device 1 may refer the details illustrated in FIGS. 18 and 19 and determine that the power consumed for executing the function B is equal to or higher than 50 (W) and equal to or lower than 60 (W) in the case where the consumed power is not limited by the power limitation unit 114. Thus, in this case, the information processing device 1 may determine that the power consumed for executing the function C is higher than the power consumed for executing the function B in the case where the consumed power is not limited by the power limitation unit 114.

Program Execution Process in Case where Second Limit Value is Set

Figure 11:
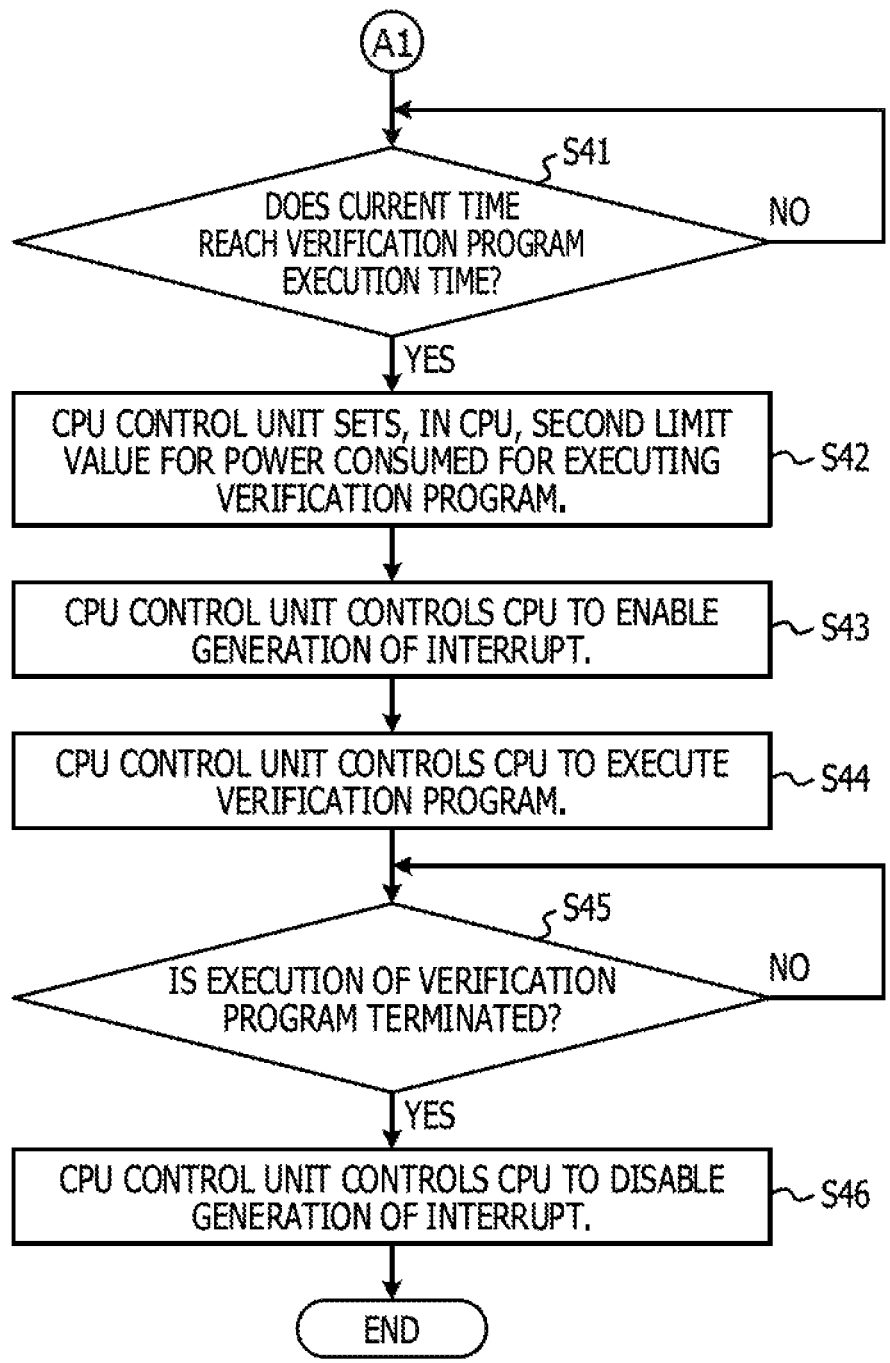

First, the program execution process to be executed in a case where the second limit value is set is described. If the CPU control unit 141 determines that the same process as that executed on the first limit value is to be executed on the second limit value (YES in S17), the CPU control unit 141 stands by until the program execution time (NO in S41), as illustrated in FIG. 11. When the current time reaches the program execution time (YES in S41), the CPU control unit 141 sets, in the CPU 101, the second limit value for power consumed for executing the program to be analyzed (in S42). In this case, the CPU control unit 141 sets the second limit value in the power limitation unit 114.

The CPU control unit 141 controls the CPU 101 to enable the generation of interrupts (in S43). In this case, the CPU control unit 141 controls the interrupt process unit 112 to enable the generation of the interrupt. Then, the CPU control unit 141 controls the CPU 101 to execute the program to be analyzed (in S44). In this case, the CPU control unit 141 controls the program execution unit 111 to execute the program to be analyzed. Specifically, in this case, the CPU control unit 141 re-executes the program to be analyzed in a state in which the second limit value that is larger than the first limit value is set in the CPU 101.

After that, the CPU control unit 141 stands by until the termination of the execution of the program to be analyzed (NO in S45). When the execution of the program to be analyzed is terminated (YES in S45), the CPU control unit 141 controls the CPU 101 to disable the generation of the interrupt (in S46). In this case, the CPU control unit 141 controls the interrupt process unit 112 to disable the generation of interrupts.

Figure 12:
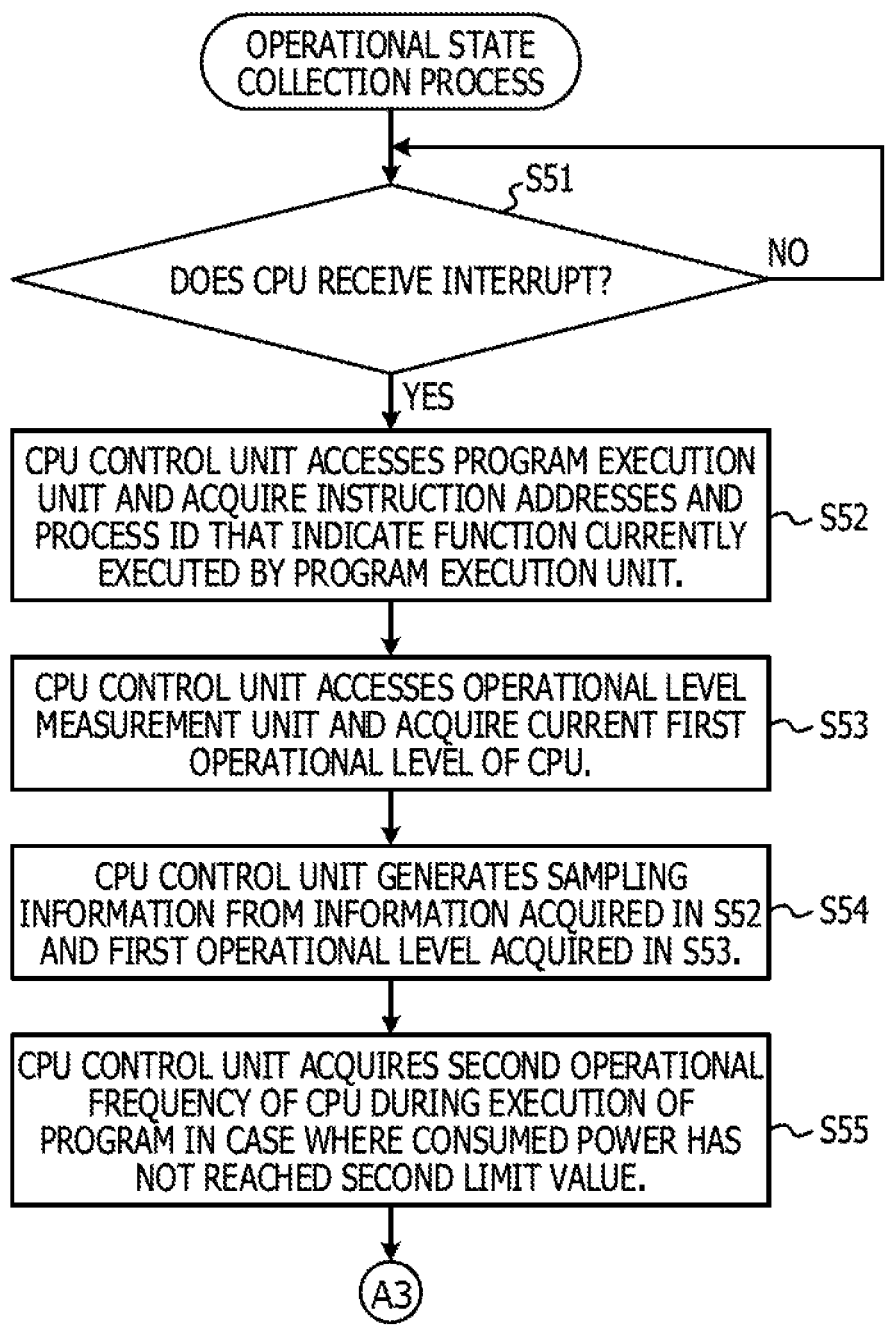
Figure 13:
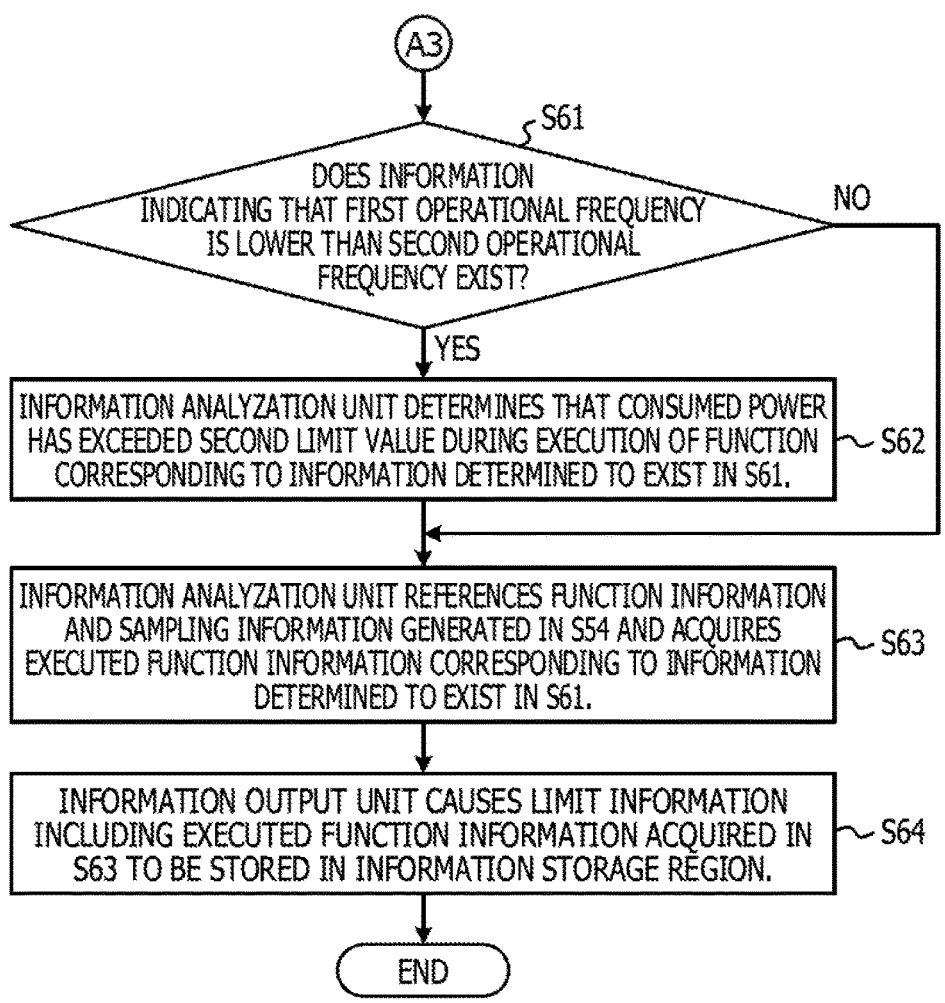

Details of Operational State Collection Process in Case where Second Limit Value is Set Next, the operational state collection process to be executed in the case where the second limit value is set is described. The CPU control unit 141 stands by until the interrupt process unit 112 receives the interrupt (NO in S51), as illustrated in FIG. 12. Specifically, the CPU control unit 141 stands by until the program executed upon the execution of the processes of S22 and S23 and to be analyzed is re-executed and the interrupt process unit 112 provides an interrupt notification.

When the interrupt process unit 112 receives the interrupt (YES in S51), the CPU control unit 141 accesses the program execution unit 111 and acquires instruction addresses and a process ID that indicate a function currently executed by the program execution unit 111 in the same manner as the process of S22 (in S52). In this case, the CPU control unit 141 accesses the operational level measurement unit 113 and acquires the first operational level that is the current operational level of the CPU 101 in the same manner as the process of S23 (in S53). In addition, the CPU control unit 141 generates the sampling information 131 from the information acquired in the process of S52 and the first operational frequency acquired in the process of S53 in the same manner as the process of S24 (in S54). An example of the sampling information 131 (hereinafter also referred to as sampling information 131a) generated in the process of S54 is described below.

Example of Sampling Information

FIG. 20 is a diagram describing the example of the sampling information 131a. The sampling information 131a illustrated in FIG. 20 includes the same items as those included in the sampling information 131 described with reference to FIG. 14. Only values set as "operational levels" included in the sampling information 131a illustrated in FIG. 20 are different from those included in the sampling information 131 described with reference to FIG. 14.

As "operational levels" of information whose "information IDs" are "1" to "5" in the sampling information 131a illustrated in FIG. 20, "0x1400", "0x1400", "0x1400", "0x1200", and "0x1400" are set.

Specifically, "0x1400" that is the second operational frequency is set as an "operational frequency" of the information whose "information ID" is "2" in the sampling information 131a illustrated in FIG. 20, unlike the sampling information 131 described with reference to FIG. 14. According to the association information 135 described with reference to FIG. 15, an "operational frequency" of the information in which the "operational level" is "0x1400" is "2.0 (GHz)".

In the sampling information 131a illustrated in FIG. 20, "0x1200" that is the second operational frequency is set as an "operational frequency" of the information whose "information ID" is "2". According to the association information 135 described with reference to FIG. 15, an "operational frequency" of the information in which the "operational level" is "0x1200" is "1.8 (GHz)". Thus, if the consumed power is not limited by the power limitation unit 114, the information analyzation unit 142 may determine that power consumed for executing a function corresponding to information whose "information ID" is "4" is higher than power consumed for executing a function corresponding to the information whose "information ID" is "2".

Return to FIG. 12. The CPU control unit 141 acquires the second operational frequency of the CPU 101 during the execution of the program to be analyzed in the case where the consumed power is not limited by the first limit value in the same manner as the process of S25 (in S55).

Then, the information analyzation unit 142 determines whether or not information indicating that the first operational frequency is lower than the second operational frequency exists in the sampling information 131 generated in the process of S55 in the same manner as the process of S31 (in S61). If the information indicating that the first operational frequency is lower than the second operational frequency exists (YES in S61), the information analyzation unit 142 determines that the consumed power has exceeded the second limit value during the execution of a function corresponding to the information determined to exist in the process of S61 (in S62). If the information indicating that the first operational frequency is lower than the second operational frequency does not exist (NO in S61), the information analyzation unit 142 does not execute the process of S62.

The information analyzation unit 142 refers to the sampling information 131a described with reference to FIG. 20 and determines that the consumed power has exceeded the second limit value during the execution of the function corresponding to the information whose "information ID" is "4", for example.

After that, the information analyzation unit 142 refers to the function information 132 and the sampling information 131 generated in the process of S54 and acquires the executed function information 133 corresponding to the information determined to exist in the process of S61 (in S63).

The information analyzation unit 142 refers to the sampling information 131a illustrated in FIG. 20 and identifies "0x00009002" that is information set as a "instruction address" of the information whose "information ID" is "4". Then, the CPU control unit 141 refers to the function information 132 illustrated in FIG. 20 and acquires, as the executed function information 133, the "function C" that is information set as a "function name" of the information in which instruction addresses including "0x00009002" are set as "instruction addresses" (in S63).

Return to FIG. 11. The information output unit 124 causes the limit information 134 including the executed function information 133 acquired in the process of S63 to be stored in the information storage region 130 (in S64). An example of the limit information (hereinafter also referred to as limit information 134a) stored in the information storage region 130 in the process of S64 is described below.

Example of Limit Information

FIG. 21 is a diagram describing the example of the limit information 134a. The limit information 134a illustrated in FIG. 21 includes the same items as those included in the limit information 134 described with reference to FIG. 17. In information whose "information ID" is "1" and that is included in the limit information 134a illustrated in FIG. 21, the "function C" is set as a "function name". Specifically, the limit information 134a illustrated in FIG. 21 indicates that a function that causes power consumed during the execution of the function to exceed the second limit value is the "function C".

In the process of S64, the information analyzation unit 142 may refer the limit information 134 described with reference to FIG. 17 and the limit information 134a described with reference to FIG. 21 and sort information included in the limit information 134 described with reference to FIG. 17 in descending order of power consumed during the execution of the functions.

The function that is among the functions (function B and function C) included in the limit information 134 described with reference to FIG. 17 and is indicated as information included in the limit information 134a described with reference to FIG. 21 is the function C. Specifically, the power consumed during the execution of the function C is higher than the power consumed during the execution of the function B in the case where the consumed power is not limited by the power limitation unit 114.

Thus, for example, as illustrated in FIG. 22, the information analyzation unit 142 may set the "function C" as a "function name" of the information whose "information ID" is "1", and the information analyzation unit 142 may set the "function B" as a "function name" of the information whose "information ID" is "2". Thus, the operator may acquire information on functions causing power consumed during the execution of the functions to reach the first limit value in descending order of power consumed during the execution of the functions in the case where the consumed power is not limited by the power limitation unit 114.

In this manner, the CPU control unit 141 of the information processing device 1 according to the embodiment sets, in the CPU 101, the first limit value for power consumed for executing the program to be analyzed. Then, the CPU control unit 141 controls the CPU 101 to execute the program to be analyzed.

In addition, the CPU control unit 141 controls the CPU 101 to enable the generation of interrupts during the execution of the program to be analyzed, associates the executed function information indicating the currently executed function with the first operational frequency of the CPU 101 during the execution of the program to be analyzed, and acquires the executed function information and the first operational frequency, as illustrated in FIG. 3. Then, the CPU control unit 141 generates the sampling information 131 from the acquired information and causes the generated sampling information 131 to be stored in the storage section 1a or the like. After that, the information analyzation unit 142 of the information processing device 1 associates, based on the generated sampling information 131, the executed function information with the limit information 134 indicating whether or not the first operational frequency is limited by the setting of the first limit value, and the information analyzation unit 142 outputs the executed function information and the limit information 134 to the storage device.

Thus, the information processing device 1 may identify a function causing power consumed for executing the function to exceed the predetermined threshold without reducing the sampling time intervals during the execution of the program to be analyzed. In addition, the information processing device 1 may suppress the amount of the information obtained by the sampling.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
set a first limit value of power consumption that the processor is permitted to consume during execution of a program to be analyzed,
control execution of the program,
control the processor to enable a generation of at least one interrupt during the execution of the program,
acquire executed function information including a process identification and one or more instruction addresses of a currently executed function included in the program and one or more operational levels of the processor corresponding to the one or more instruction addresses,
acquire one or more first operational frequencies of the processor corresponding to the one or more operational levels,
acquire a second operational frequency when the power consumption does not reach the first limit value,
compare the first operational frequency and the second operational frequency, and
output, when at least one of the one or more first operational frequencies is lower than the second operational frequency, limit information indicating that the consumed power has reached the first limit value during the execution of the program in association with the executed function information.

2. The information processing device according to claim 1, wherein the second operational frequency is measured at a different time during execution of the program or stored in the memory in advance.

3. The information processing device according to claim 1, wherein the processor is configured to acquire the executed function information and the one or more first operational frequencies in response to the at least one interrupt.

4. The information processing device according to claim 1, wherein the at least one interrupt includes a plurality of interrupts, and each of the plurality of interrupts is generated at predetermined time intervals.

5. The information processing device according to claim 1, wherein the processor is configured to:

set a second limit value larger than the first limit value after the execution of the program executed upon the setting of the first limit value is terminated, execute the program upon setting of the second limit value, determine that the consumed power has reached the second limit value during the execution of the program when the processor determines that at least one of the one or more first operational frequencies is lower than the second operational frequency during the execution of the program executed upon the setting of the second limit value, and determine that the consumed power has not reached the second limit value during the execution of the program when the processor determines that the at least one of the one or more first operational frequencies is not lower than the second operational frequency, wherein the output limit information includes information indicating whether the consumed power has reached the second limit value.

6. The information processing device according to claim 1, wherein the processor is configured to:

refer to association information in which operational levels of the processor are associated with operational frequencies of the processor, respectively, and acquire the one or more first operational frequencies from the association information based on the one or more operational levels.

7. The information processing device according to claim 1, wherein the executed program includes a plurality of functions and the processor is configured to generate sampling information during the execution of the program, store the sampling information in the memory, and associate, based on the generated sampling information, the executed function information with the limit information.

8. An information processing device comprising:

a memory; and a Central Processing Unit (CPU) configured to execute a kernel and an application, the kernel constituting a central core of an operating system, the application operating on the kernel to analyze characteristics of an executable computer program including a plurality of functions, wherein the kernel is configured to:

set a first limit value used to limit power consumed by the CPU during execution of the computer program, and control the CPU to execute the computer program, the CPU is configured to:

acquire executed function information including a process identification and one or more instruction addresses of a currently executed function included in the program and one or more operational levels of the processor corresponding to the one or more instruction addresses, acquire one or more first operational frequencies of the processor corresponding to the one or more operational levels, acquire a second operational frequency when the power consumption does not reach the first limit value, compare the first operational frequency and the second operational frequency, and output, when at least one of the one or more first operational frequencies is lower than the second operational frequency, limit information indicating that the consumed power has reached the first limit value during the execution of the program in association with the executed function information.

9. The information processing device according to claim 8, wherein the CPU is further configured to limit the power consumed during execution of the program based on the first limit value set by the kernel.

10. The information processing device according to claim 8, wherein the CPU is further configured to lower the operational frequency during the execution of the program based on instructions from the kernel when the consumed power reaches the first limit value.

11. A computer-implemented method of analyzing power consumption of a processor during execution of a computer program to be analyzed, the method comprising:

setting a first limit value of power consumption that the processor is permitted to consume during execution of the program;

controlling execution of the program; generating at least one interrupt to the processor during the execution of the program;

acquiring executed function information including a process identification and one or more instruction addresses of a currently executed function included in the program and one or more operational levels of the processor corresponding to the one or more instruction addresses;

acquiring one or more first operational frequencies of the processor corresponding to the one or more operational levels;

acquiring a second operational frequency when the power consumption does not reach the first limit value;

comparing the first operational frequency and the second operational frequency; and outputting, when at least one of the one or more first operational frequencies is lower than the second operational frequency, limit information indicating that the consumed power has reached the first limit value during the execution of the program in association with the executed function information.

12. A non-transitory computer-readable medium storing executable instructions, which when executed by a computer, cause the computer to perform an operational state collection process, the process comprising:

setting a first limit value of power consumption that the processor is permitted to consume during execution of the program;

controlling execution of the program;

generating at least one interrupt to the processor during the execution of the program;

acquiring executed function information including a process identification and one or more instruction addresses of a currently executed function included in the program and one or more operational levels of the processor corresponding to the one or more instruction addresses;

acquiring one or more first operational frequencies of the processor corresponding to the one or more operational levels;

acquiring a second operational frequency when the power consumption does not reach the first limit value;

comparing the first operational frequency and the second operational frequency; and outputting, when at least one of the one or more first operational frequencies is lower than the second operational frequency, limit information indicating that the consumed power has reached the first limit value during the execution of the program in association with the executed function information.

\* \* \* \* \*